United States Patent
Chang et al.

(10) Patent No.: US 8,274,975 B2
(45) Date of Patent: *Sep. 25, 2012

(54) SYSTEM AND METHOD FOR AUTOMATICALLY MANAGING A NETWORK PORT BASED ON A CALENDAR FUNCTION

(75) Inventors: Yung-Fu Chang, San Jose, CA (US); Trey Wafer, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 628 days.

This patent is subject to a terminal disclaimer.

(21) Appl. No.: 12/352,207

(22) Filed: Jan. 12, 2009

(65) Prior Publication Data

US 2009/0119398 A1    May 7, 2009

Related U.S. Application Data

(63) Continuation of application No. 11/018,712, filed on Dec. 20, 2004, now Pat. No. 7,483,394.

(51) Int. Cl.
*H04L 12/28* (2006.01)

(52) U.S. Cl. ........ 370/389; 370/254; 370/469; 709/220; 709/221

(58) Field of Classification Search .................. 709/220, 709/221
See application file for complete search history.

(56) References Cited

U.S. PATENT DOCUMENTS

| | | | |
|---|---|---|---|
| 7,321,926 B1* | 1/2008 | Zhang et al. | 709/220 |
| 7,483,394 B2* | 1/2009 | Chang et al. | 370/254 |
| 7,584,262 B1* | 9/2009 | Wang et al. | 709/217 |
| 2002/0116564 A1* | 8/2002 | Paul et al. | 710/301 |
| 2003/0160815 A1* | 8/2003 | Muschetto | 345/733 |
| 2005/0044418 A1* | 2/2005 | Miliefsky | 713/201 |
| 2005/0113880 A1* | 5/2005 | Gordon | 607/40 |
| 2006/0133405 A1 | 6/2006 | Fee | |
| 2006/0209714 A1 | 9/2006 | Ackermann-Markes et al. | |
| 2008/0080548 A1* | 4/2008 | Mullendore et al. | 370/442 |

* cited by examiner

*Primary Examiner* — Duc C Ho

(57) ABSTRACT

Embodiments of the invention provide a system and method for automatically managing a network port based on a calendar function. In one embodiment, a discovery protocol is provided for automatically discovering at least one port of at least one switch in a network. Furthermore, a management protocol is provided. The management protocol is configured to automatically manage the at least one port of the at least one switch in the network based on a programmable calendar function. In addition, a reconfiguration protocol is also provided. The reconfiguration protocol is configured to reconfigure the calendar function of the automatic management of the at least one port of the at least one switch in the network.

18 Claims, 7 Drawing Sheets

500

300

Configure Schedule

Name 305: test

Apply configuration at 310

Weekly

Sunday
Monday
Tuesday
Wednesday
Thursday
Friday
Saturday

Time 320: 5 : 35 : 07 PM

Start Date: 330  June 20 2003

End Date: 340  June 27 2003

Fig. 3

List of Current Schedules 410

| Status 411 | Schedule Name 412 | Next Scheduled Run Time 413 | Type 414 |
|---|---|---|---|
| ● | upgrade1056387018282 | Mon Jun 23 09:56:00 PDT 2003 | Firmware Upgrade |
| ● | weekly1 | Fri Jun 27 12:58:40 PDT 2003 | Device Configuration |
| ● | fridays | Fri Jun 27 15:34:33 PDT 2003 | Device Configuration |
| ● | monthly1 | Sun Jul 20 12:58:08 PDT 2003 | Device Configuration |

Select All    Unselect All

Options 420: Enable | Disable | Delete | Refresh | Cancel

Fig. 4

SYSTEM AND METHOD FOR AUTOMATICALLY MANAGING A NETWORK PORT BASED ON A CALENDAR FUNCTION

RELATED APPLICATIONS

This application is a continuation of U.S. Patent Application No. 11/018,712 filed, Dec. 20, 2004 now U.S. Pat. No. 7,483,394, incorporated by reference herein.

TECHNICAL FIELD

The present invention generally relates to managing network switches and ports. More specifically to a system and method for automatically managing a network port based on a calendar function.

BACKGROUND ART

Modern networking continues to provide an improvement in communication and information access. As an example, in-house data centers, associated with a particular entity of interrelated group of users, could contain a large number of information technology (IT) resources that are interconnected through a network. These networks are configured in different ways depending on implementation-specific details such as the hardware used and the physical location of the equipment, and depending on the particular objectives of the network. One common type of network configuration is a local area network (LAN). In actual practice, a typical LAN will include large numbers of computer systems and switches (as well as other devices). Devices such as computer systems, routers, switches, load balancers, firewalls, network switches, and the like, are commonly linked to each other in networks.

Network switches are normally used to provide an access to the network. For example, a user will normally connect to one or more of the ports of a network switch to access the network (e.g., LAN, wide area network (WAN), Internet, or the like). However, one of the security concerns of network access is the availability of and access to the network switch. That is, the network can only be as secure as the weakest access point. In many cases, the network switch (or port) is the weakest access point. For example, if a network switch is located in a shared location, e.g., a conference room, any person in the conference room may plug into a port of the network switch and gain access to the network.

The problem is even more pronounced in a location that is utilized on a part-time basis. For example, a group may use a firehouse hall for a gathering or meeting place. In the firehouse hall there may be a port for the firehouse network. Therefore, a guest may simply plug into the port and gain access to the entire firehouse network. In some cases, this access may be benign, but in other cases, the access may be malicious.

In order to prevent access to the ports of the network switch, a plurality of measures can be taken. In one case, an administrator may be assigned the job of physically disconnecting the port from the network, such as at the wiring closet. In another case, the port or network switch may be physically covered to stop a user from accessing the port.

However, these methods are time consuming, labor intense, and are very inflexible. For example, if a user is still working when the port is disconnected at the wiring closet, productivity will be affected. Additionally, there may be confrontation at the port when the administrator arrives to cover the access to the port. If a user has to work late, both the user and the administrator are deleteriously affected. The user must justify the need to maintain access to the network, and the administrator must return at a later time to cut-off the access to the port.

These problems are even more detrimental in an environment with mixed working hours and the network switch being disconnected from the network includes a plurality of ports. For example, the users may not be on the same port but may be using the same network switch. For example, if the firehouse hall and the Captains office are on the same network switch, the Captain will be disconnected when the firehouse hall network switch is removed from the network.

DISCLOSURE OF THE INVENTION

Embodiments of the invention provide a system and method for automatically managing a network port based on a calendar function. In one embodiment, a discovery protocol is provided for automatically discovering at least one port of at least one switch in a network. Furthermore, a management protocol is provided. The management protocol is configured to automatically manage the at least one port of the at least one switch in the network based on a programmable calendar function. In addition, a reconfiguration protocol is also provided. The reconfiguration protocol is configured to reconfigure the calendar function of the automatic management of the at least one port of the at least one switch in the network.

BRIEF DESCRIPTION OF THE DRAWINGS

The accompanying drawings, which are incorporated in and form a part of this application, illustrate embodiments of the present invention, and together with the description, serve to explain the principles of the invention. Unless noted, the drawings referred to this description should be understood as not being drawn to scale.

FIG. 3 is an exemplary scheduling calendar screen for programming switches and port access in accordance with one embodiment of the present invention.

FIG. 4 is an exemplary schedule management screen shown in accordance with one embodiment of the present invention.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Overview

Figure 1:
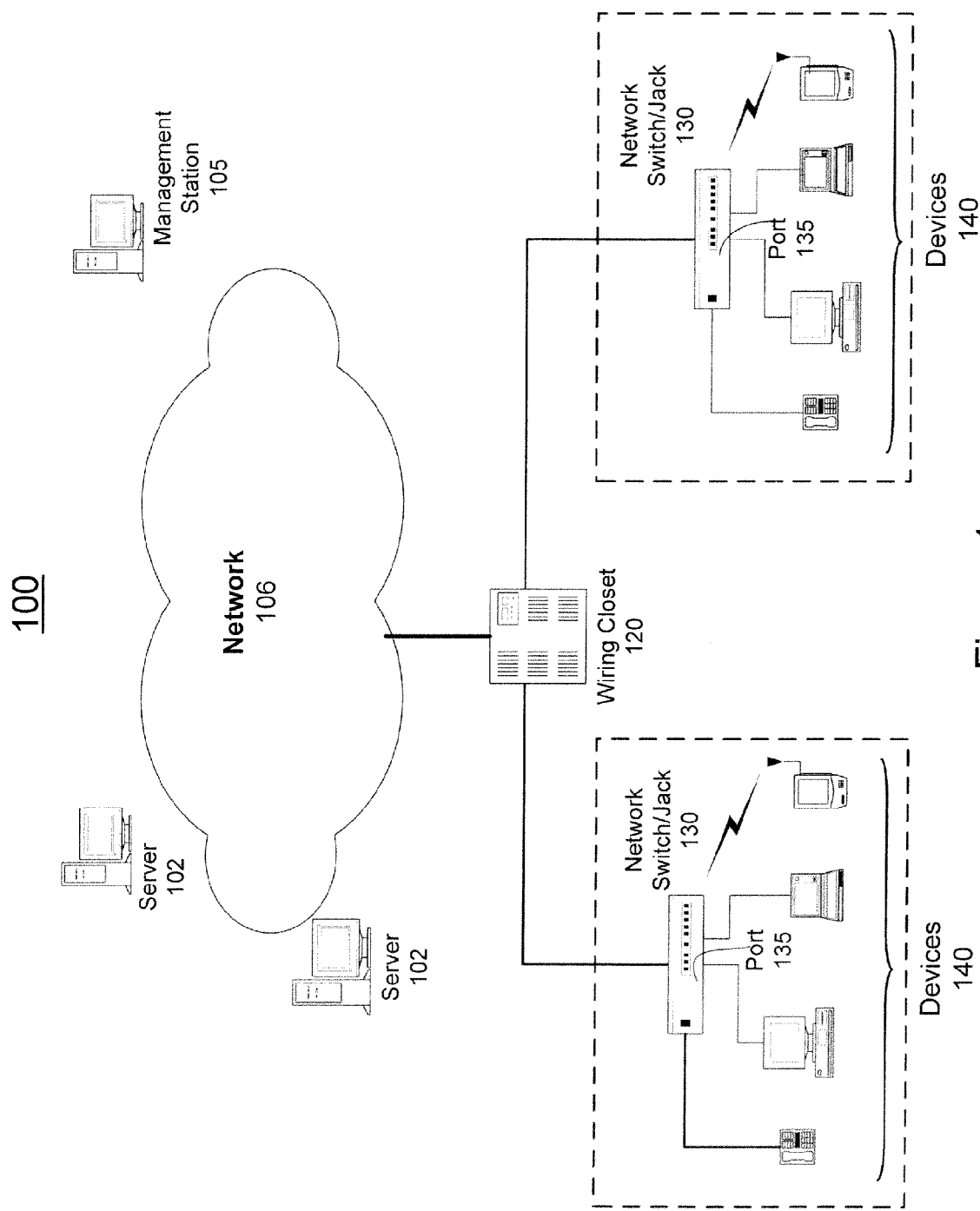
FIG. 1 is a diagram of an exemplary system is shown in accordance with one embodiment of the present invention.

With reference to FIG. 1, one embodiment provides a method of managing the port(s) 135 of the switch(es) 130 from the management station 105. In general, the management station 105 is used to discover the network switch(es) 130 and associated port(s) 135. Once the network switches 130 and ports 135 are discovered, the management station 105 then provides a set of identification and calendar options which allows the network manager to turn on or off ports 135 and/or switches 130. The management station 105 can manage each ports 135 and/or switch 130 on both a day and time format. That is, the management station 105 can activate or deactivate a port 135 and/or switch 130 on a specific day and at a specific time. For example, the network manager could use the management station 105 and set up a calendar function wherein ports 1-5 will allow traffic daily from 8 am to 5 pm.

Furthermore, the network manager could use the management station 105 and set up a calendar function wherein switch 12 is only available on every other Wednesday from 10 pm to 6 am. That is, the network manager can utilize the management station 105 and set up a calendar function wherein any port 135 or switch 130 in the network 106 can be controlled on a scheduled basis, without requiring a person to physically readjust the port 135 or switch 130 settings either via computer or physically disabling the port. In other words, once the calendar function is established for the port 135, the port 135 will be managed on the calendar schedule automatically.

Therefore, the network manager's work load is significantly reduced because the manager can set up any port 135 or switch 130 on a schedule and not be tied up on a daily basis performing the same time consuming and tedious tasks. Moreover, the security of the network 106 is greatly increased since there is no possibility of a network technician forgetting to establish the proper port 135 or switch 130 configurations.

In addition, while utilizing the management station 105 calendar protocols, if a port 130 and/or switch 135 requires a change in status, the network manager is able to change the setting of the port 135 or switch 130 by accessing the calendar function and modifying the setting of the particular port 135 or switch 130. Therefore, if a user were staying late, or arriving early, the user will simply contact the network manager and request access to the network 106 via the port 130 of switch 135. The network manager will update the calendar function (either on a one time update basis, for a specified time, or permanently) to provide the user access to the network 106 via the port 135 of switch 130. Thus, a user on device 140 will have network 106 access real-time, or near real-time while the network manager performed the port status change from a remote location, e.g., from his home computer connected to the network 106.

With reference still to FIG. 1, a diagram of an exemplary system is shown in accordance with one embodiment of the present invention. In one embodiment, the system 100 includes server(s) 102, wiring closet 120, and management station 105 communicatively coupled via a network 106. The wiring closet being coupled with at least one network switch 130 having at least one port 135, and at least one device 140 utilizing port 115.

In general, the network 106 may be a wireless network or a wired network. The server(s) 102 may be any type of computing system normally coupled with a network 106 including dedicated server, personal computing device, disk storage, etc. The management station 105 may be a personal computer (e.g., desktop, laptop, handheld), personal information device (PID), or the like. Wiring closet 120 may be on on-site or off-site storage area utilized for storing the hardware that connects the switches and ports to the network. In one embodiment, the wiring closet 120 may be located in a plurality of rooms and/or geographic locations.

In operation, the network switch (or Jack) 130 provides at least one port 135 for providing a connection to the network 106 for a device 140. The device 140 may be a computing system (e.g., a desktop, laptop, server, etc.), a telephone, a personal information device (PID), a mobile phone, a router, or the like. In other embodiments, the network switch 130 may have a plurality of ports 135 per device. Moreover, the wiring closet may be coupled with a plurality of network switches 130 each having a plurality of ports 135 thereon. Thus, the wiring closet 120 is capable of supporting tens, hundreds, thousands or more ports providing access to the network 106.

Operation

Figure 2:
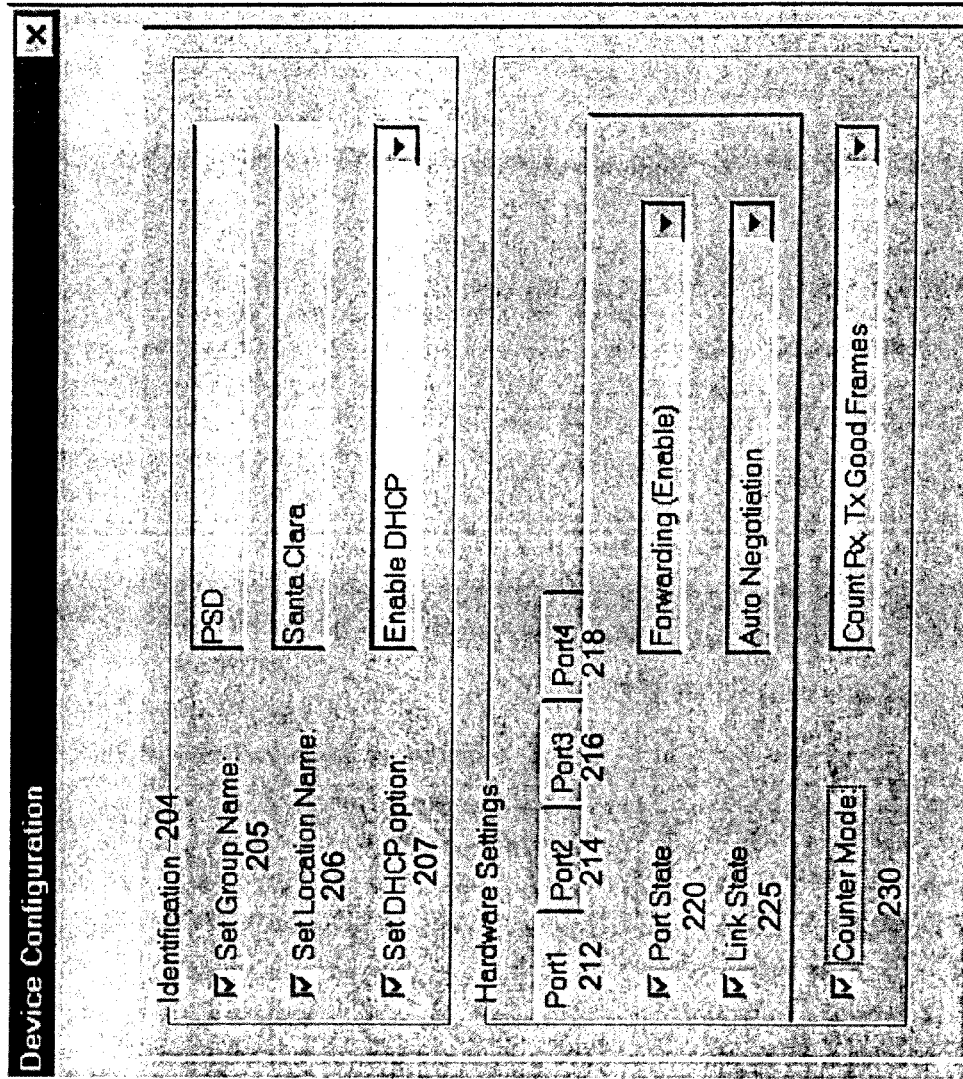
FIG. 2 is an exemplary configuration for formatting switches and ports in accordance with one embodiment of the present invention.

With reference now to FIG. 2, an exemplary configuration for formatting switches and ports is shown in accordance with one embodiment of the present invention. In one embodiment, device configuration screen 200 is a graphic user interface (GUI) for providing a user the switches and ports in a network such as network 106. In another embodiment, device configuration screen 200 is shown on a standard display and interacted with by a mouse, keyboard, or the like. The device configuration screen 200 is one of the pluralities of possible initial switch and port listing protocols which are available to the management station 105. In one embodiment, the network manager would log onto the management station 105 utilizing a security protocol (e.g., password, bio scan, smart card, no security protocol or the like) to initially gain access to the network and the initial device configuration screen 200.

In one embodiment, device configuration screen 200 is the screen displayed on the management station 105 (of FIG. 1) after the discovery program has been initiated. That is, in one embodiment, the management station 105 initially accesses the network 106 and discovers each switch 130 and port 135. Once the switches 130 and ports 135 have been discovered, the information is stored on the management station 105. Once the switches 130 and ports 135 are discovered, the device configuration screen 200 will allow a network manager to see and manage the switches and ports in the network. In another embodiment, the network manager may be limited to managing only a portion of the network and therefore the management station 105 will allow a network manager to manage only the portion of ports 135 and switches 130 within the manager's network authority.

In one embodiment, the device configuration screen 200 provides identification 204 of the switch 130 based on a group name 205, a location name 206 and a Dynamic Host Configuration Protocol (DHCP) 207. Although the one embodiment utilizes these three parameters, the switch identification 204 may be based on fewer, more, or different protocols. Once the switch is identified, the hardware settings 210 are also shown. In one embodiment, the hardware settings 210 include the number of ports 135 available for the switch 130. For example, device configuration screen 200 shows 4 ports (212-218). Furthermore, each port is selectable, (e.g., port 212) is selected in the present example, and the port state 220, link state 225 and counter mode 230 are also given per selected port. Again, it is appreciated that there may be fewer, more or different levels of information provided per port. The use of the present three options is merely one of a plurality of possible user preferences. Thus, the device configuration screen 200 is used to provide the network manager with a status of the network and each switch and port thereon.

With reference now to FIG. 3, an exemplary scheduling calendar for programming switches 130 and port 135 access is shown in accordance with one embodiment of the present invention. Configure screen 300 includes name 305, time 320, start date 330, stop date 340 and repetition 310.

In general, a network manager will select the switch and port (e.g., port 212 of FIG. 2) and then select the configure screen 300. At this point, the network manager will be able to manage the ports active and inactive periods. For example, a name 305 is applied to the schedule (e.g., test, port 212, night operations, etc.). Then, the port is configured to be either operational or non-operational on a specific day 310 (e.g., Monday-Sunday, weekly, bi-weekly, monthly, etc.) at a specific time 320 (e.g., 5:35::07PM). Moreover, the configure screen 300 allows a user to select a start date 330 and end data 340 (e.g., Jun. 20, 2003 and Jun. 27, 2003 respectively). In another embodiment, the port may not have an end date, or a start date, or time, or the like. That is, the preferences per port could be a simple on time and off time regardless of the date. Moreover, the preferences per port could also be extremely detailed. The level of intricacy is one of the preferences available to the network manager.

Therefore, the network manager can adjust the port usage to be active on a specific day at a specific time and inactive on a specific day and at a specific time. Additionally, each setting of the port (e.g., active, inactive) may be performed on a different configure screen 300 or on the same configure screen 300. That is, the present configure screen 300 is one of a plurality of possible configurations. The use of a single management step for the port is merely for purposes of clarity. The configure screen 300 could show every port on a switch, a plurality of ports on a switch, a plurality of switches, or the like. The options are merely preferences selected by the user which do not affect the overall operation of the calendar function.

With reference now to FIG. 4, an exemplary schedule management screen 400 is shown in accordance with one embodiment of the present invention. That is, a reference table for managing the schedules for each port or switch. In general, schedule management screen 400 includes a list of current (or active) schedules 410 and options 420. As stated herein, the schedule management screen 400 may include fewer, more, or other options than those shown. The present schedule management screen 400 and options thereon is shown merely for purposes of clarity. In one embodiment, by utilizing a current list of schedules 410, the network manager can look up the status 411 of a port schedule based on schedule name 412, run time 413, type 414, or any other preference a user may have. The user may also utilize a plurality of options 420 on the list of current schedules 410 such as enable, disable, delete, refresh, cancel, or the like.

Therefore, as in the example of a port user requesting off-time access to a port, when the network manager receives the call from the user, the network manager can access the calendar function, find the desired schedule and modify it (e.g., one time, many times, constant, etc.) from his/her location. Thus, there is no need for anyone to physically access the wiring closet 120, or port 135 (of FIG. 1) to allow access to the network. It is also appreciated that the network manager is any user that has been given access to the management station 105.

Figure 5:
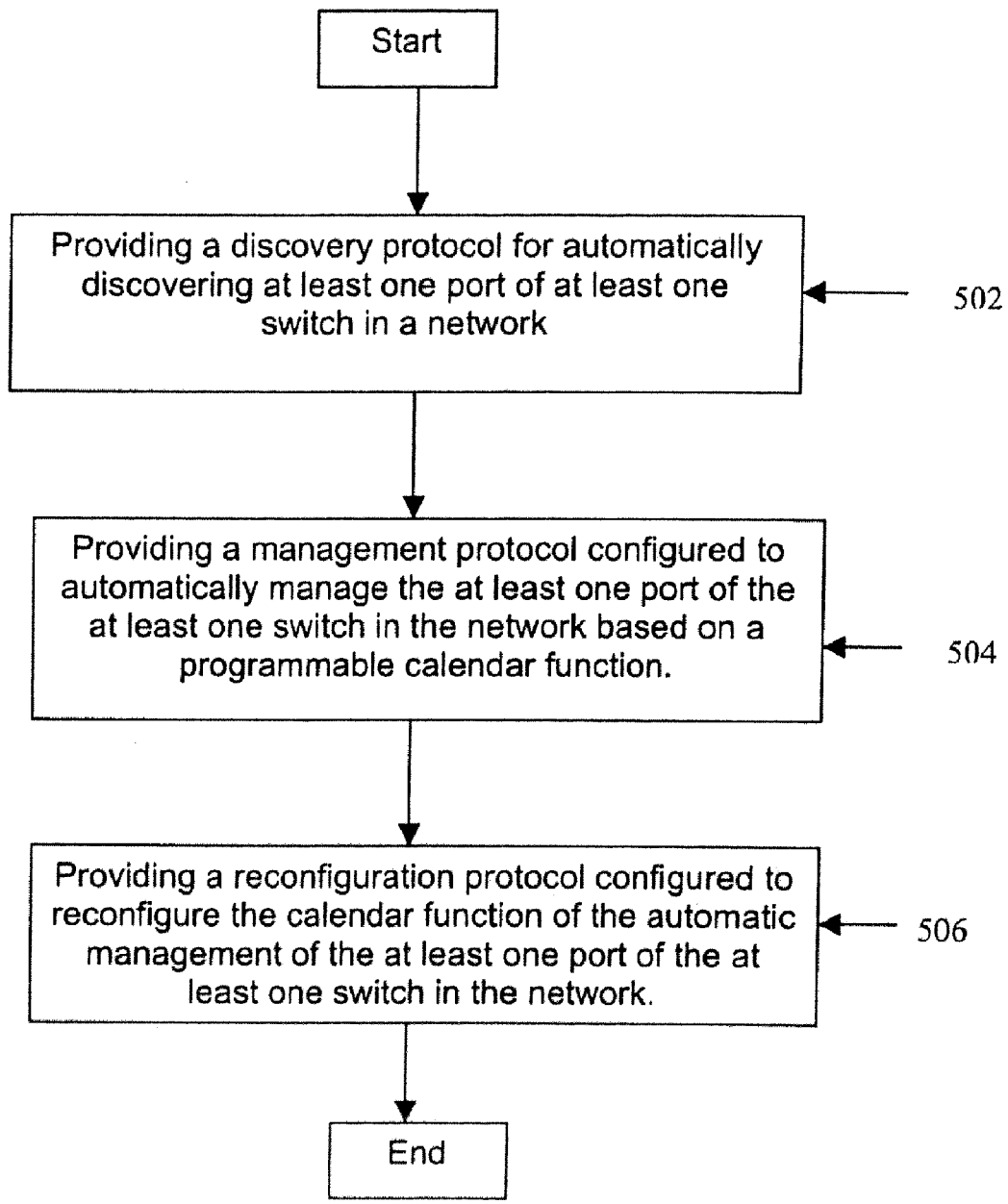
FIG. 5 is a flow chart of the steps for automatically managing a network port based on a calendar function in accordance with one embodiment of the present invention.

Referring now to FIG. 5, a flow chart of the steps for automatically managing a network port based on a calendar function is shown in accordance with one embodiment of the present invention.

With reference now to Step 502 of FIG. 5 and to FIG. 1, in one embodiment, a discovery protocol is provided for automatically discovering at least one port of at least one switch in a network. In another embodiment, the discovery protocol discovers every port of every switch in the network. In one embodiment, a snooping program or other type of layout recognition method is run on the management station 105 to perform the discovery.

By discovering the ports 135 and switches 130 in the network 1106, the management station 105 will have an updated and accurate list of the ports 135 and switches 130 in the network. Therefore, the network manager does not need to manually input the switch and port information into the management's station 105. However, the information may be input manually, or checked manually against the discovery results. In one embodiment, the management station 105 is in a remote location (e.g., offsite) connected to the network 106 either wired or wirelessly.

With reference now to step 504 of FIG. 5 and to FIG. 1, one embodiment provides a management protocol configured to automatically manage the at least one port of the at least one switch in the network based on a programmable calendar function. That is, the management station 105 can utilize the calendar functions of FIGS. 2 through 4 to efficiently manage the ports 135 of the network 106. In another embodiment, the management protocol automatically manages every port of every switch in the network.

In one embodiment, the calendar management functions for the port and/or switch include time constraints, location (e.g., building 1 or 2), group (e.g., first floor of building one), and network (e.g., a segmented network within the overall network 106 such as a virtual LAN within the overall network 106). As described in detail herein, the calendar management functions can be at the switch 130 level or the port 135 level. In addition, there may be a plurality of functions per port. For example, in one embodiment, the network manager may have switch A (including ports 1-4) operational from 8 am to 8 pm. However, the port 3 may only be operational from 8 am to noon.

In another embodiment, the port 135 and/or switch 130 may be on and off a plurality of times in a day, week, month, etc. The limitations of the port 135 and/or switch 130 controls are limited only by the schedules input into the calendar management protocol.

Referring now to step 506 of FIG. 5 and to FIG. 1, one embodiment provides a reconfiguration protocol configured to reconfigure the calendar function of the automatic management of the at least one port of the at least one switch in the network. For example, if a user requested access to a port outside of the scheduled operating parameters of the port, then a reconfiguration would be necessary. Additionally, if a group was dissolved, or a vacation was scheduled, the port could be shut down for a term of time based on the vacation or until the next need for the port was established.

In one embodiment, the reconfiguration protocol provides real-time or near real-time access to the at least one port of at least one switch in the network. For example, if a user requests access to a port, the user would contact the network manager and request the access. The network manager would then access the calendar function (e.g., the list of schedules 400) and modify the port designation to allow the user to access the network 106 via the port. Therefore, there is no need for any person to physically interact with the port or the network. The adjustment of the port access can be performed remotely and almost instantaneously.

Figure 6:
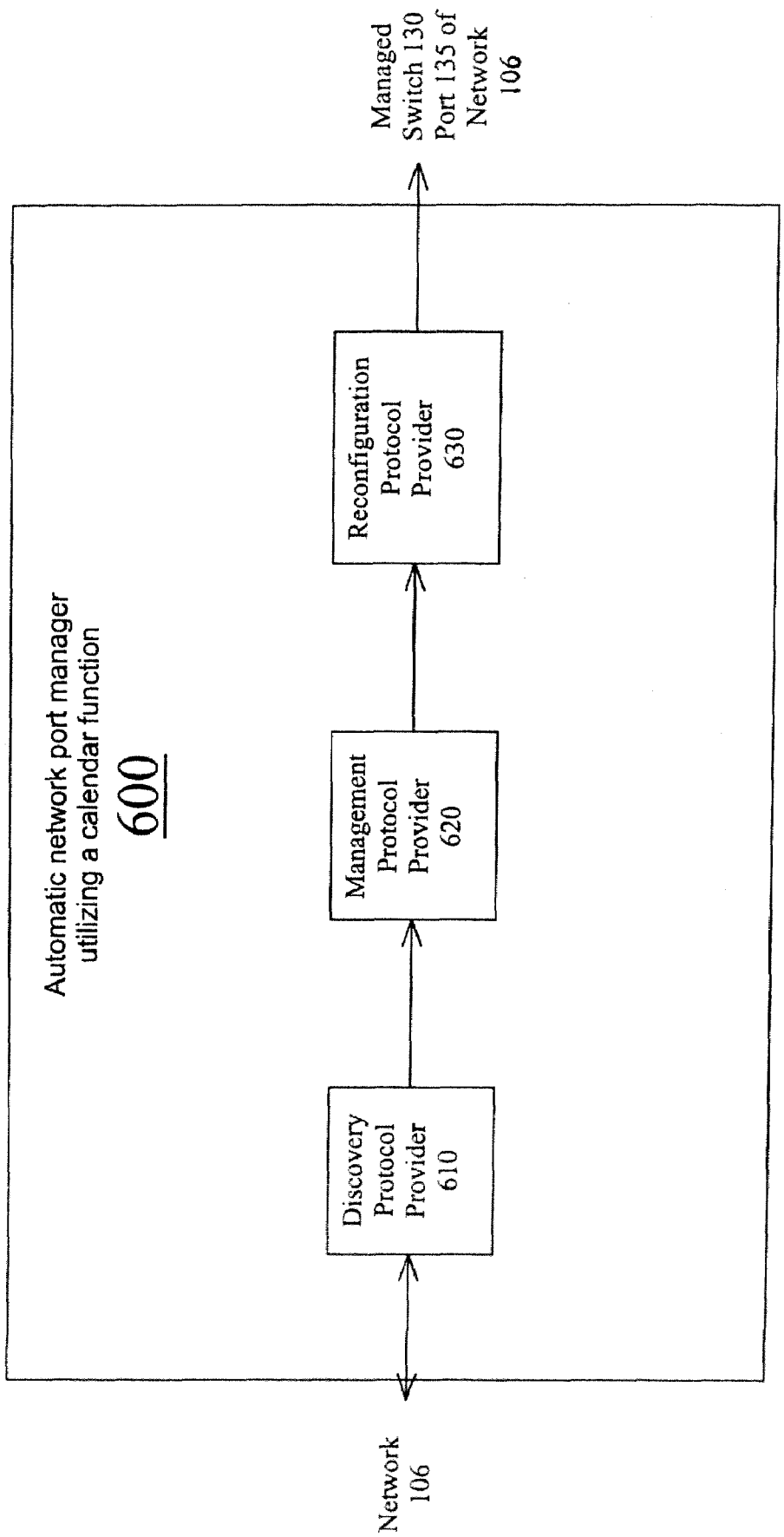
FIG. 6 is a block diagram of an automatic network port manager utilizing a calendar function in accordance with one embodiment of the present invention.

With reference now to FIG. 6, an automatic network port manager utilizing a calendar function 600 is shown. In one embodiment, the automatic network port manager utilizing a calendar function 600 includes a discovery protocol provider 610, a management protocol provider 620 and a reconfiguration protocol provider 630.

In general, the discovery protocol provider 610 is utilized for automatically discovering at least one port 135 of at least one switch 130 in a network 106. That is, the discovery protocol provider 610 will initially access a network 106 and search the network 106 for at least one port 135 of at least one switch 130. In another embodiment, the discovery protocol provider 610 will discover every switch 130 and every port 135 within the network 106. In yet another embodiment, the discovery protocol provider 610 will discover a pre-assigned number (or a pre-assigned location, or the like) of ports 135 or switches 130. Once the discovery protocol provider 610 has discovered the port 135 and switch 130, the information is passed to the management protocol provider 620.

The management protocol provider 620 is configured to automatically manage the at least one port 135 of the at least one switch 130 in the network based on the programmable calendar function described in detail herein. In another embodiment, the management protocol provider 620 will manage every switch 130 and every port 135 within the network 106. In one embodiment, the management protocol provider 620 provides a management of the port 135 and/or switch 130 based on the programmable calendar function. In so doing, the management protocol provider 620 allows a consistent management tool for ensuring proper port 135 and switch 130 utilization. That is, in one embodiment, the management protocol provider 620 provides a calendar management method for systematically allowing and denying access to a port 135 and/or switch 130 based on a time/day/date format.

The reconfiguration protocol provider 630 is configured to reconfigure the calendar function of the automatic management of the at least one port 135 of the at least one switch 130 in the network 106 established by the management protocol provider 620. In another embodiment, the reconfiguration protocol provider 630 will be configured to reconfigure every switch 130 and every port 135 within the network 106 established by the management protocol provider 620. That is, as described in detail herein, the reconfiguration protocol provider 630 allows a reconfiguration function of the calendar management method for systematically allowing and denying access to a port 135 and/or switch 130 based on a time/day/date format. For example, when a need exists for a port 135 and/or switch 130 to be utilized outside of its normally scheduled window of operation, the reconfiguration protocol provider 630 allows the port 135 and/or switch 130 to be reconfigured to allow access. In similar fashion, when a need exists for a port 135 and/or switch 130 to be disabled inside of its normally scheduled window of operation, the reconfiguration protocol provider 630 allows the port 135 and/or switch 130 to be reconfigured to deny access.

In one embodiment, the automatic network port manager 600, including the discovery protocol provider 610, the management protocol provider 620 and the reconfiguration protocol provider 630 are communicatively coupled via a remote network connection with the network 106.

Figure 7:
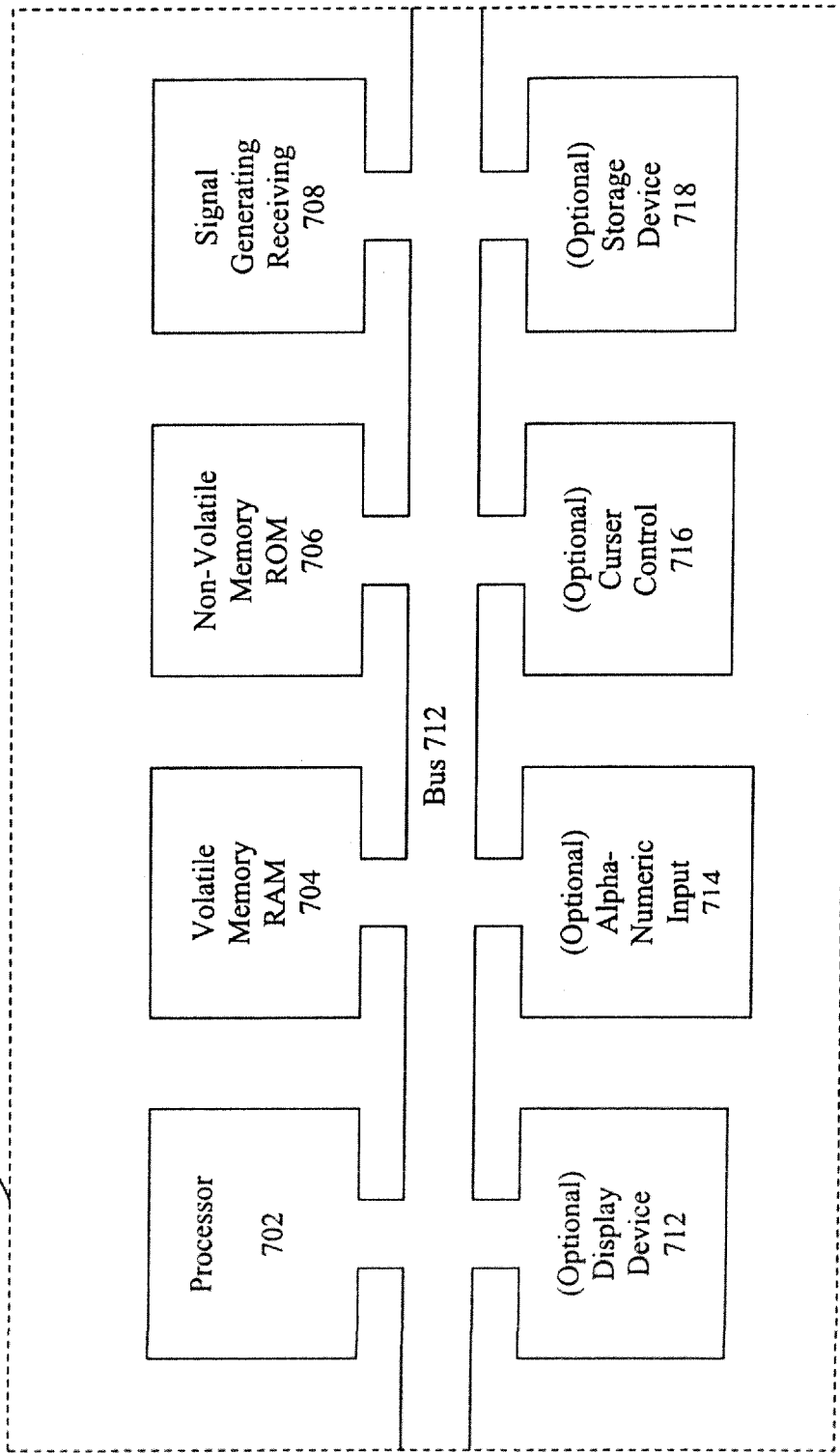
FIG. 7 is a block diagram of an exemplary computer system used in accordance with one embodiment of the present invention.

With reference now to FIG. 7, a block diagram of an embodiment of an exemplary computer system 700 used in accordance with the present invention. For example, computer system 700 may represent the management station 105, the user devices 140, the servers 102 and/or the automatic network port manager 600. It should be appreciated that computing system 700 is not strictly limited to be a computer system. As such, computing system 700 of the present embodiment is well suited to be any type of computing device (e.g., server computer, portable computing device, desktop computer, mobile phone, pager, personal digital assistant, etc.). Within the following discussions of the present invention, certain processes and steps are discussed that are realized, in one embodiment, as a series of instructions (e.g., software program) that reside within computer readable memory units of computer system 600 and executed by a processor(s) of computing system 700. When executed, the instructions cause computer system 700 to perform specific actions and exhibit specific behavior that is described in detail herein.

Computer system 700 of FIG. 7 comprises an address/data bus 710 for communicating information, one or more central processors 702 coupled with bus 710 for processing information and instructions. Central processor unit(s) 702 may be a microprocessor or any other type of processor. The computer system 700 also includes data storage features such as a computer usable volatile memory unit 704 (e.g., random access memory, static RAM, dynamic RAM, etc.) coupled with bus 710 for storing information and instructions for central processor(s) 702, a computer usable non-volatile memory unit 706 (e.g., read only memory, programmable ROM, flash memory, EPROM, EEPROM, etc.) coupled with bus 710 for storing static information and instructions for processor(s) 702. Computer system 700 also includes one or more signal generating and receiving devices 708 coupled with bus 710 for enabling computer system 700 to interface with other electronic devices and computer systems. The communication interface(s) 708 of the present embodiment may include wired and/or wireless communication technology.

Optionally, computer system 700 may include an alphanumeric input device 714 including alphanumeric and function keys coupled to the bus 710 for communicating information and command selections to the central processor(s) 702. The computer system 700 can include an optional cursor control or cursor directing device 716 coupled to the bus 710 for communicating user input information and command selections to the central processor(s) 702. The cursor-directing device 716 may be implemented using a number of well-known devices such as a mouse, a track-ball, a track-pad, an optical tracking device, and a touch screen, among others. Alternatively, it is appreciated that a cursor may be directed and/or activated via input from the alphanumeric input device 714 using special keys and key sequence commands. The present embodiment is also well suited to directing a cursor by other means such as, for example, voice commands.

The computing system 700 of FIG. 7 may also include one or more optional computer usable data storage devices 718 such as a magnetic or optical disk and disk drive (e.g., hard drive or floppy diskette) coupled with bus 710 for storing information and instructions. An optional display device 712 is coupled to bus 710 of computing system 700 for displaying video and/or graphics. It should be appreciated that optional display device 712 may be a cathode ray tube (CRT), flat panel liquid crystal display (LCD), field emission display (FED), plasma display or any other display device suitable for displaying video and/or graphic images and alphanumeric characters recognizable to a user.

Thus, Embodiments allow configuration parameters of a managed network device (e.g., switch or Network Jack) be reconfigured at any specified time by a management station (e.g., PC or workstation) over the network. It incorporates a server-and-client model for communication between a management station and the Network Jack(s). The management software running on the management station not only controls the parameter setting of the network devices, but also includes a calendaring scheduler function. Once user selects a desired configuration profile with the management software, he can also specify from the calendaring scheduler when to invoke the configuration profile of the device. The configuration profile is stored as a database file on the management station and the schedule is registered with the system timer. The system timer will check the schedule(s) and execute the specified profile accordingly.

The system timer information can either be derived from the system clock of the management station or synchronized with the network using Network Time Protocol. Several basic calendaring functions can be provided, including but not limited to: start and end time, start and end dates, pop-up calendar for date selection, select single or multiple days of a week, select single or multiple months of a year, repeat action weekly, repeat action monthly, repeat forever and the like.

Therefore, embodiments of the present invention provide methods and systems for automatically managing a network port based on a calendar function. Moreover, embodiments provide a real-time or near real-time adjustment to the port or switch access. Furthermore, by managing the port and/or switch access remotely, more efficient utilization of the port activity can be realized. Additionally, by automating the daily, weekly, even hourly operation of each port and/or switch in the network, the security of the network is increased and the man-hours related to manually activating and deactivating ports and/or switches is reduced.

Embodiments of the present invention are thus described. While the present invention has been described in particular embodiments, it should be appreciated that the present invention should not be construed as limited by such embodiments, but rather construed according to the following claims.

We claim:

1. A method for automatically managing a network port based on a programmable calendar function comprising:
   utilizing a management protocol to automatically manage at least one port of a switch in the network based on a programmable calendar function; and
   utilizing a reconfiguration protocol to reconfigure said programmable calendar function of said automatically managed at least one port of said switch in the network;
   wherein said management protocol and said reconfiguration protocol are performed from a remote network connection.

2. The method of claim 1 wherein the programmable calendar function includes parameters selected from the group of parameters including: time, location, group, and network.

3. The method of claim 1 wherein said reconfiguration protocol further comprises:
   accessing said at least one port of said switch in a network for reconfiguration in real time.

4. The method of claim 3 wherein the reconfiguration protocol further comprises:
   reconfiguring said at least one port in real time from a management station over a wireless network connection.

5. The method of claim 1 wherein the management protocol further comprises:
   configuring said at least one port on said switch in said network based on said calendar function.

6. A computer system comprising:
   a bus;
   a memory unit coupled to said bus; and
   a processor coupled to said bus, said processor for executing a method for automatically managing a network port based on a programmable calendar function comprising:
   utilizing a management protocol to automatically manage at least one port of a switch in the network based on a programmable calendar function; and
   utilizing a reconfiguration protocol to reconfigure said programmable calendar function of said automatically managed at least one port of said switch in the network;
   wherein said management protocol and said reconfiguration protocol are performed from a remote network connection.

7. The computer system of claim 6 wherein the programmable calendar function is selected from the group of functions including: time, location, group, and network.

8. The computer system of claim 6 wherein said reconfiguration protocol further comprises:
   accessing said at least one port of said switch in a network for reconfiguration in real time.

9. The computer system of claim 8 wherein the reconfiguration protocol further comprises:
   reconfiguring said at least one port in real time from a management station over a wireless network connection.

10. The computer system of claim 6 wherein said management protocol further comprises:
    configuring said at least one port on said switch in said network based on said calendar function.

11. A non-transitory computer-usable storage medium having instructions embodied therein that when executed cause a computer system to perform a method for automatically managing a network port based on a programmable calendar function comprising:
    utilizing a management protocol to automatically manage at least one port of a switch in the network based on a programmable calendar function; and
    utilizing a reconfiguration protocol to reconfigure said programmable calendar function of said automatically managed at least one port of said switch in the network;
    wherein said management protocol and said reconfiguration protocol are performed from a remote network connection.

12. The non-transitory computer-usable storage medium of claim 11 wherein the calendar function is selected from the group of functions including: time, location, group, and network.

13. The non-transitory computer-usable storage medium of claim 11 wherein said reconfiguration protocol further comprises:
    accessing said at least one port of said switch in a network for reconfiguration in real time.

14. The non-transitory computer-usable storage medium of claim 13 wherein the reconfiguration protocol further comprises:
    reconfiguring said at least one port in real time from the management station over a wireless network connection.

15. The non-transitory computer-usable storage medium of claim 11 wherein the management protocol further comprises:
    configuring said at least one port on said switch in said network based on said calendar function.

16. A method for automatically managing a network port based on a programmable calendar function comprising:

utilizing a management protocol to automatically manage at least one port of a switch in the network based on a programmable calendar function; and utilizing a reconfiguration protocol to reconfigure said programmable calendar function of said automatically managed at least one port of said switch in the network, access said at least one port of said switch in a network for reconfiguration in real time, and reconfigure said at least one port in real time from a management station over a wireless network connection.

17. A computer system comprising:

a bus;

a memory unit coupled to said bus; and a processor coupled to said bus, said processor for executing a method for automatically managing a network port based on a programmable calendar function comprising:

utilizing a management protocol to automatically manage at least one port of a switch in the network based on a programmable calendar function; and utilizing a reconfiguration protocol to reconfigure said programmable calendar function of said automatically managed at least one port of said switch in the network, access said at least one port of said switch in a network for reconfiguration in real time, and reconfigure said at least one port in real time from a management station over a wireless network connection.

18. A non-transitory computer-usable storage medium having instructions embodied therein that when executed cause a computer system to perform a method for automatically managing a network port based on a programmable calendar function comprising:

utilizing a management protocol to automatically manage at least one port of a switch in the network based on a programmable calendar function; and utilizing a reconfiguration protocol to reconfigure said programmable calendar function of said automatically managed at least one port of said switch in the network, access said at least one port of said switch in a network for reconfiguration in real time, and reconfigure said at least one port in real time from the management station over a wireless network connection.

* * * * *